US006596994B1

(12) United States Patent
Alkire et al.

(10) Patent No.: US 6,596,994 B1
(45) Date of Patent: Jul. 22, 2003

(54) BEAM POSITION MONITOR

(75) Inventors: Randy W. Alkire, Naperville, IL (US); Gerold Rosenbaum, Homer Township, IL (US); Gwyndaf Evans, Cambridge (GB)

(73) Assignee: The United States of America as represented by the United States Department of Energy, Washington, DC (US)

( * ) Notice: Subject to any disclaimer, the term of this patent is extended or adjusted under 35 U.S.C. 154(b) by 317 days.

(21) Appl. No.: 09/665,958

(22) Filed: Sep. 21, 2000

(51) Int. Cl.[7] .................................................. G01T 1/29

(52) U.S. Cl. ..................................... 250/336.1; 378/205

(58) Field of Search .............................. 250/336.1, 366, 250/367, 370.14; 378/205, 207

(56) References Cited

U.S. PATENT DOCUMENTS 3,935,450 A * 1/1976 Spurgeon .................... 378/205
5,056,129 A * 10/1991 Steinmeyer ................. 378/205

* cited by examiner

Primary Examiner—Costantine Hannaher
Assistant Examiner—Shun Lee
(74) Attorney, Agent, or Firm—Bradley W. Smith; Mark P. Dvorscak; Paul A. Gottlieb

(57) ABSTRACT

An apparatus for determining the position of an x-ray beam relative to a desired beam axis. Where the apparatus is positioned along the beam path so that a thin metal foil target intersects the x-ray beam generating fluorescent radiation. A PIN diode array is positioned so that a portion of the fluorescent radiation is intercepted by the array resulting in an a series of electrical signals from the PIN diodes making up the array. The signals are then analyzed and the position of the x-ray beam is determined relative to the desired beam path.

6 Claims, 5 Drawing Sheets

MEASUREMENTS IN INCHES

BEAM POSITION MONITOR

CONTRACTUAL ORIGIN OF THE INVENTION

The United States Government has rights in this invention pursuant to Contract No. W-31-109-ENG-38 between the U.S. Department of Energy and the University of Chicago.

FIELD OF THE INVENTION

This invention is a device to monitor the position of an X-ray beam relative to a preferred position.

BACKGROUND OF THE INVENTION

Since the early days of synchrotron radiation, users have been concerned with the position and stability of the X-ray beam. Third-generation synchrotron sources with undulators pose even greater demands on positioning devices given the increased heat load and distances of up to 55 m between the undulator and the first optical element. The application of current optics to synchrotron radiation can produce uncollimated beam dimensions at the sample of 38 $\mu$m, vertical, by 83 $\mu$m, horizontal for a beam having a photon flux density of $3 \times 10^{15}$ photons $s^{-1}$ $mm^{-2}$ at 12 keV and 100 mA. The high flux density and low convergence of the focused beam permit further reductions in beam size through collimation while retaining sufficient flux for fast data collection. These characteristics are useful for investigating small samples. With collimating slit dimensions of 50 $\mu$m×50 $\mu$m or less, it is necessary to have precise monochromatic beam positioning. When the beam size reaches 1–2 mm a quadrant PIN photodiode can be used to intercept the edges of the focused beam while passing the main beam undisturbed. Current density limits of the photodiode prevent detection of the full undulator beam. In addition, the outer edges of the X-ray beam may not accurately describe the center-of-mass of the focused beam, leading to positioning errors. For narrow-beam applications, the method of choice has been the split ion chamber. The split ion chamber is essentially 'non-interfering', is capable of less than 5 $\mu$m positioning accuracy, and has a linear working range of a few millimeters. Split ion chambers can, however, suffer from recombination and space charge effects and can report false readings when operated near a strong scattering source. In addition, the device is not vacuum compatible and must be relatively long, typically $\geq 5$ cm in length to achieve adequate signal strength. Since split ion chambers measure in only one dimension, two such devices are required to obtain horizontal and vertical information simultaneously.

An alternative to the split ion chamber has been developed for small beams using a thin CVD diamond photodetector. This device demonstrates relatively high position sensitivity for low energy X-rays e.g. 2–10 keV. However, position resolution is currently beam-size dependent with the best resolution obtained for beam sizes close to half the inter-electrode spacing of 0.5 mm. Errors in determining the beam centroid may also occur since only the outer portion of the beam is used for position determination.

The subject invention relates to an improved device and method for monitoring the position of an X-ray beam using four PIN photodiode detectors and fluorescence radiation generated from a metal foil target placed in the path of the X-ray beam. The device is vacuum compatible and can operate over a wide energy range. The primary purpose of the beam-position monitor will be to correct tune losses when changing the energy of the monochromator and to measure changes in beam position during data collection.

Thus, one object of this invention is to provide a position-sensitive PIN diode array apparatus to detect monochromatic beam movement in both the vertical and horizontal direction.

Another objective of this invention is the capability of optimizing the metal foil target selected for the correct absorption, thickness and fluorescence to correspond with the energy of the beam.

Another object of the invention is the capability to provide for a number of different metal foils within the vacuum chamber to provide for the ability to change the metal foil employed without breaking the vacuum or disrupting the beam.

Another object of the invention is to provide a mechanism whereby the position of the PIN diodes can be altered during calibration without disrupting the beam.

Additional advantages, objects and novel features of the invention will become apparent to those skilled in the art upon examination of the following and by practice of the invention.

SUMMARY OF THE INVENTION

To achieve the foregoing and other advantages, this invention is an apparatus and method for determining the position of an X-ray beam. This information is needed in order to keep the X-ray beam focused on the pre-sample slits. This is accomplished by use of a four PIN diode array located upstream of a metal foil which is positioned so as to intersect the x-ray beam. The metal foil has an approximate thickness of 0.5 $\mu$m and where the foil is positioned in the X-ray beam. Using conventional difference-over-the-sum techniques, two-dimensional position information is obtained from the metal foil fluorescence. Because the full X-ray beam passes through the metal foil, the true center of the beam is measured. Since the PIN diodes are positioned away from the direct X-ray beam, diode linearity is maintained at all undulator power levels. After calibration, the apparatus provides magnitude and direction of a change in beam position, making it possible to compute exact position corrections. The device combines high sensitivity with wide spacing between diodes, thus, allowing the array to be used for coarse adjustments as might be encountered during beamline reconfiguration. The diode spacing can be altered to increase diode sensitivity or expand the operating displacement range. In addition, the foil thickness, absorption, and fluorescent radiation can be altered to provide for high energy beams.

In addition, the apparatus can be placed after the beam defining slits to measure the intensity of the beam. Accurate monitoring of the X-ray beam incident to the sample makes it possible to scale experimental data with any changes in the incident X-ray flux.

BRIEF DESCRIPTION OF THE DRAWINGS

The present invention is illustrated in the accompanying drawing where.

DETAILED DESCRIPTION OF THE INVENTION

Figure 1:
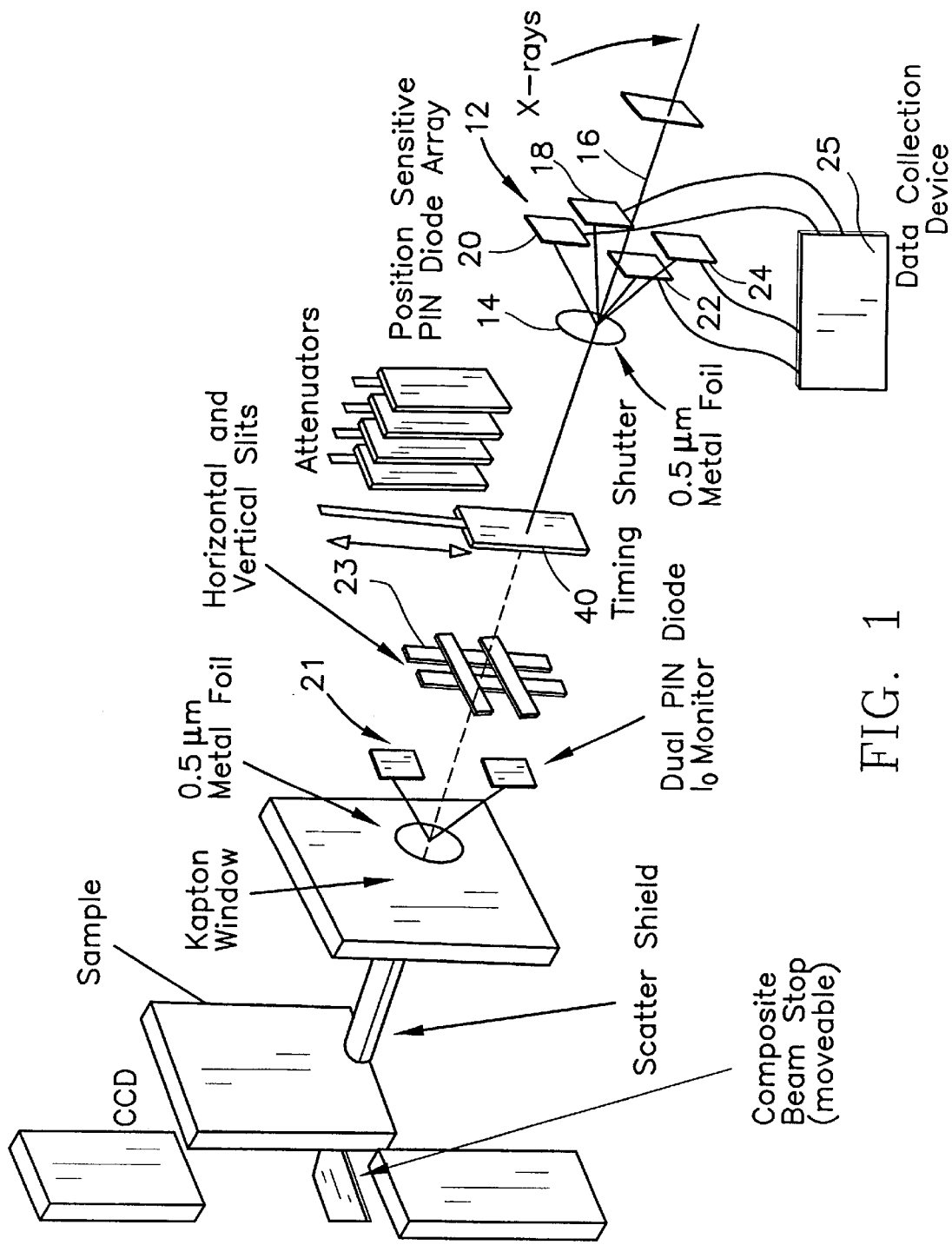
FIG. 1 illustrates the apparatus in relation to a beam line and its surrounding end-station components.
Figure 2:
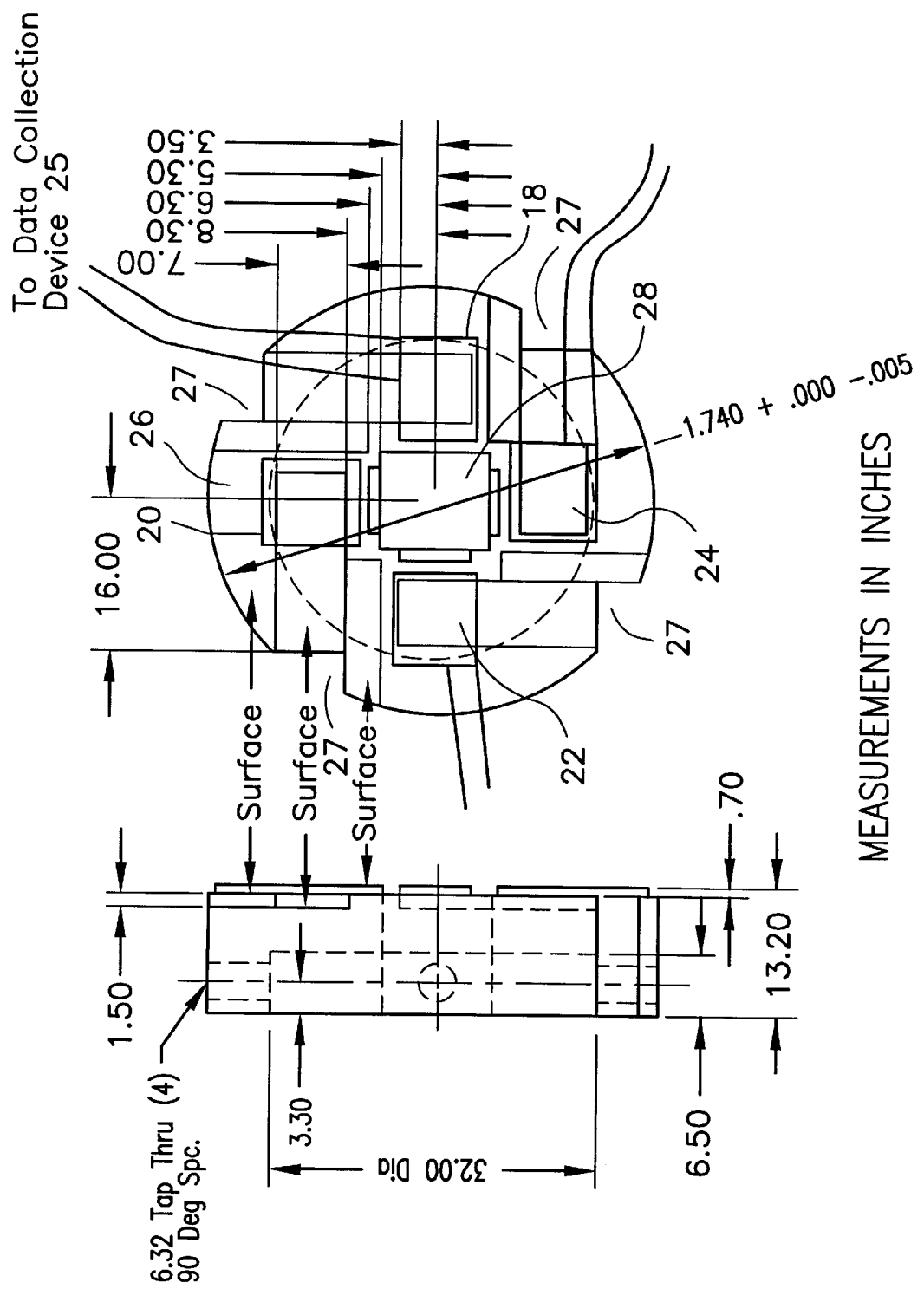
FIG. 2 is the PIN diode holder.

FIG. 1 depicts a schematic of the PIN diode array, 12, in relation to the metal foil, 14. The metal foil provides the fluorescence to the PIN diode array, 12, when illuminated by the X-ray beam 16. The PIN diode array consists of four PIN diodes, 18,20, 22, and 24 (Model S100V; UDT Sensors Inc.). The diodes, 18, 20, 22, and 24, are positioned approximately 90° apart and are mounted on a plastic holder, 26, as shown in FIG. 2. Each diode is electrically connected to a data collection device 25. Further, each diode measures 10 mm×10 mm with a small inactive area extending outside the 100 mm² region. The size of the diode may vary depending on the specific model chosen. The PIN diodes can be placed symmetrically about the center of the plastic holder or in the alternative, the PIN diode can be positioned so that the distance between the upper and lower PIN diodes is 10.7 mm while the horizontal diodes are spaced 12.6 mm apart. An 8.0 mm, vertical,×10.6 mm, horizontal, center opening, 28, has been machined into the plastic holder to provide a large unobstructed pathway for the X-ray beam. In addition, a notch, 27, in the PIN holder acts as a vacuum pumpout during the evacuation process. As illustrated in FIG. 1, the foil fluorescence source, 14, is positioned downstream of the diode holder. Typically a 11 mm diameter, 0.5 $\mu$m-thick foil of Cr ($K_{edge}$ 5989 eV, $K_{a1}$ 5415 eV) or Ti ($K_{edge}$ 4966 eV, $K_{a1}$ 4511 eV) is used. Metal foils of this size are commercially available (ACF Metals Co., Inc.) and can be acquired directly attached to a stainless steel washer without any additional substrate beneath the metal foil surface. In the alternative, the metal foil can be deposited onto a thin Kapton film for additional support. As is illustrated in FIG. 4, the foil, 14, is fixed in position with respect to the diodes, 22 and 24, so that vertical or horizontal movement of the array, 12, does not change the foil position relative to the diodes, 18, 20, 22 and 24.

Figure 3:
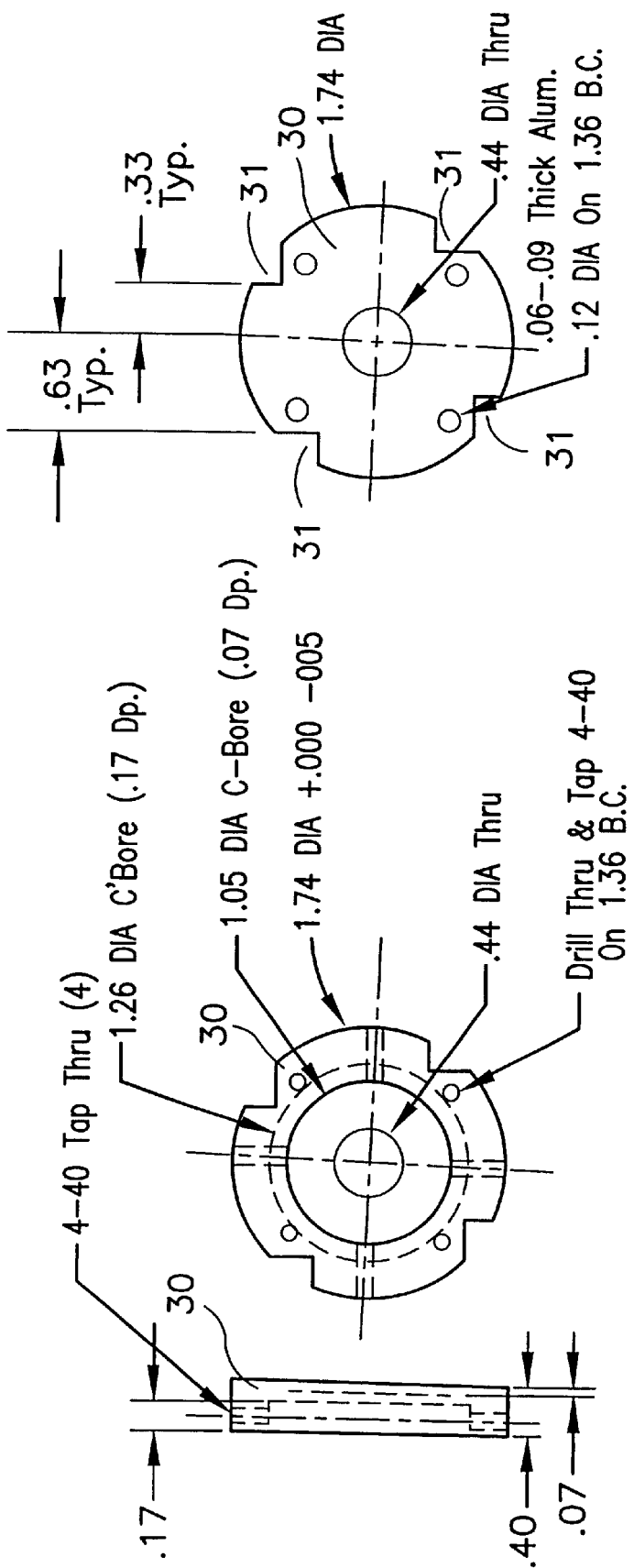
FIG. 3 is the metal foil holder

The stainless steel washer has an 11 mm internal diameter and the metal foil completely covers this opening. The washer is loaded into a high-purity aluminum shell, 30, FIG. 3, securing the metal foil in place and blocking any fluorescence that might be admitted by the stainless steel. In addition, a notch 31, in the shell 30 acts as a vacuum pumpout during the evacuation process. The position of the metal foil, 14, is approximately 9 mm from the plane of the diodes, FIG. 4.

Figure 4:
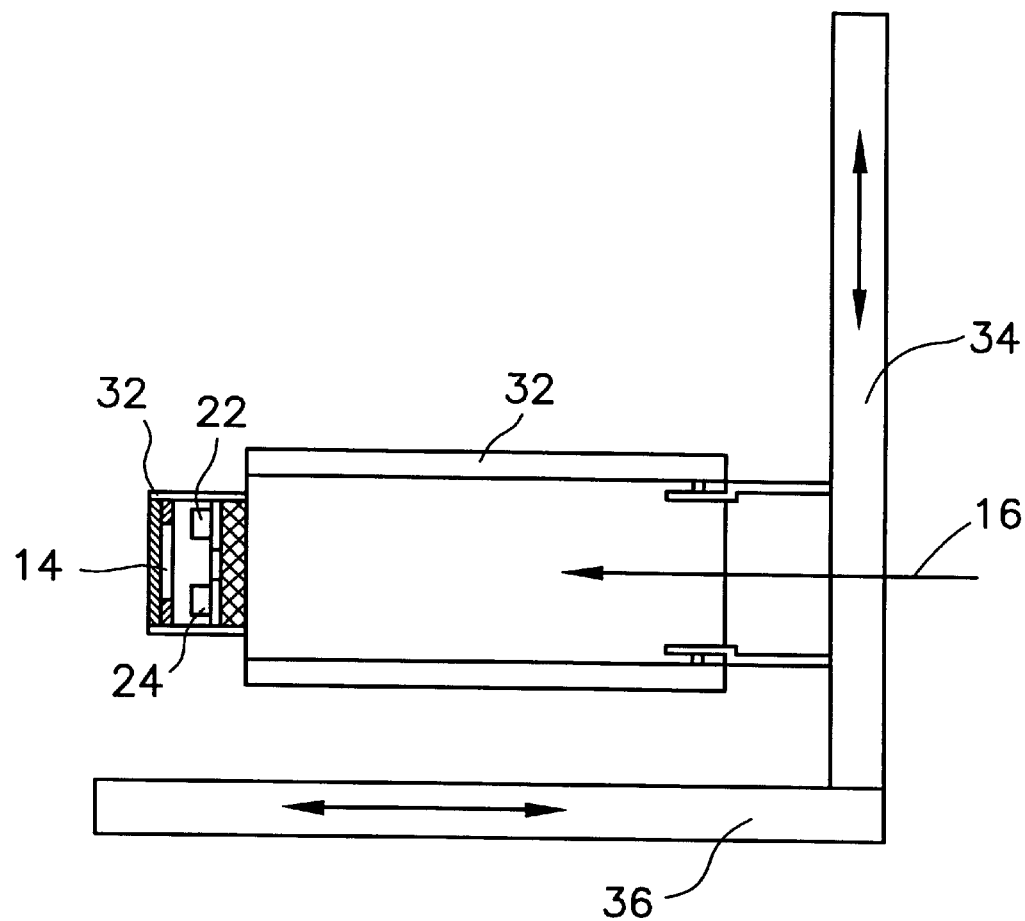
FIG. 4 is a schematic showing the components of the beam position monitor.

After installing the metal foil, the completed assembly is inserted into the light-tight flight path assembly, 32, FIG. 4, and the diode array is positioned at approximately 5.9 m downstream from the monochromator. The flight path assembly 32 is evacuated to a rough vacuum. The PIN diodes are unbiased and the photocurrent signals are fed via an electrometer amplifier(not shown) in conjunction with a voltage-to-frequency converter (not shown) to a data collection device or scaler, 25, FIG. 1. Two motorized translations stages 34 and 36, FIG. 4, support the PIN diode array assembly and allow for calibration and centering of the PIN diode assembly with respect to the beam position. The translation stages 34 and 36 are driven by DC motors (not shown). Their position and therefore, the position of the diodes is measured using high-resolution optical linear encoders. The arrows indicate the direction of the linear motion for the translation stages, vertically for 34 and horizontally for 36.

The efficiency of a PIN diode depends on the absorption cross section for silicon, $\mu$E, and the thickness of the active region of the diode. Since diode characteristics are fixed at the time of purchase, tuning the device to meet differing needs rests on the choice of metal foil used.

Three primary criteria must be considered when selecting the foil. First, fluorescence yield, the amount of fluorescent radiation emitted per unit incident absorbed intensity, which increases with atomic number. Second, the fluorescent energy should occur in a region where the spectral sensitivity on the PIN diode is relatively high. Finally, it is advantageous to select an element that has no absorption edge in the operating energy range.

Figure 5:
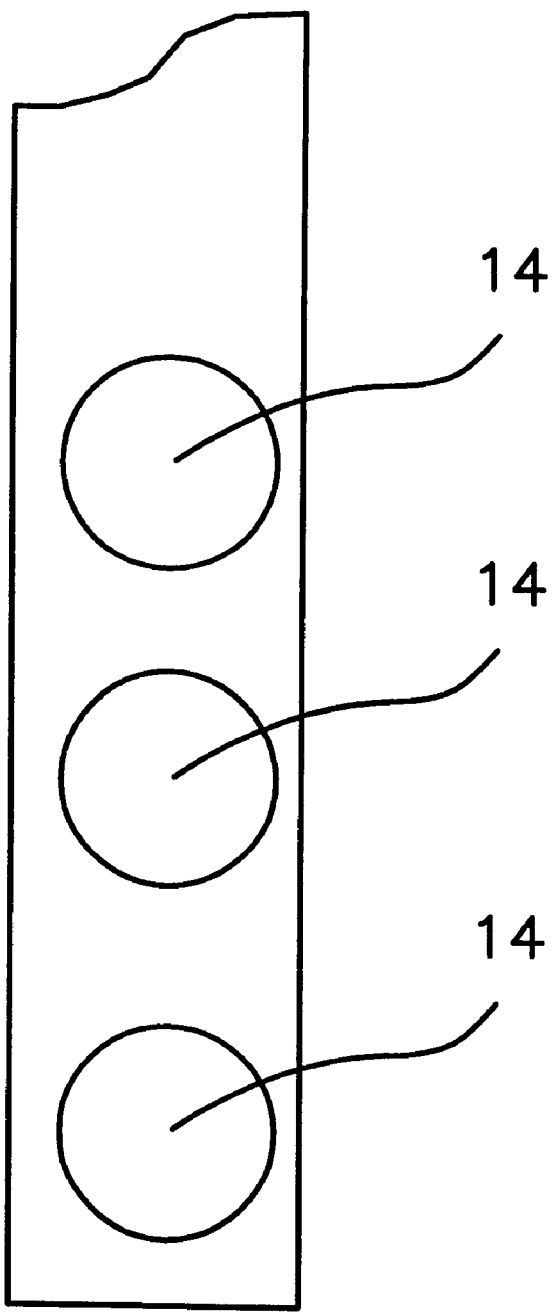
FIG. 5 is a drawing of an alternative metal foil holding apparatus.

To allow for a multiplicity of different metal foils to be used without having to re-pressurize the system, the single foil system of FIG. 4 can be replaced by a series of foils mounted on a strip, FIG. 5. In the typical case, each metal foil would have different physical properties, and the strip would undergo translation and positioning, relative to the pin array, by means of a motor-track system (not shown).

Optimal spectral sensitivity of the PIN diodes used in the array is the visible to ultraviolet light range. However, X-ray sensitivity is still high enough to provide adequate signal strength using fluorescent emissions from 4 to 8 keV. Because $\mu$E for silicon decreases with increasing energy, it is advantageous to keep the fluorescent X-ray energy relatively low.

The foil material must be chemically stable, able to tolerate high doses of radiation and be easily manufactured into thin foils of uniform thickness without voids e.g. 0.5–2 $\mu$m. Some materials which meet these requirements are Ti, Cr, Fe, Co, Ni, Cu, and Zn. The emission energies of these materials are low ranging between 4.5 and 8.6 keV.

PIN diodes are light sensitive so care must be taken to minimize stray light.

Calibration of the diode array response versus beam position is acquired in reverse mode: the array mounted on a translation stage, is scanned relative to a stationary beam. Vertical calibration, for example, is computed by subtracting the bottom diode signal from the top diode signal, then dividing by their sum. This method is referred to as the difference over the sum technique. With independent readouts, both directions can be monitored simultaneously. Since the difference/sum is a normalized signal, it is inherently independent of beam intensity and photon energy. In addition, because the entire beam is used in the measurement, the true center-of-mass is measured.

Calibrations were internally consistent when measured either in vacuum or air. The presence of air introduces main-beam air scatter into the measurement and increases fluorescence absorption. It is therefore necessary to perform separate calibrations in air and in vacuum.

By positioning the diode array upstream of the crystallographic timing shutter, 40, FIG. 1, the beam can be continuously monitored. In addition, since normally the opening sized into the holder for the PIN diodes, FIG. 4, is 8–10 mm on a side, this provides considerable flexibility in monitoring beam position. This makes the device useful for coarse adjustments as might be encountered when moving beamline components during installation of a mirror. If there is a requirement to increase diode sensitivity, the opening could be narrowed or conversely, by increasing the size of the opening, the displacement coverage could be increased.

In addition to its beam position monitoring capabilities, the apparatus can also be used to measure intensity (without position) by summing all four diode signals or summing the vertical or horizontal pairs. This makes the device useful as an intensity monitor, often referred to as a I-zero monitor 21, FIG. 1, where the dual PIN diode as shown is replaced by the four PIN array 12, FIG. 1. High detection sensitivity allows this device to be used after the beam defining slits 23. Accurate monitoring of the X-ray beam incident on the sample makes it possible to scale experimental data with any changes in the incident X-ray flux, as might be the case with decaying X-ray ring current at a synchrontron source, without loss of linearity or significant absorption of the X-ray beam.

Other experiments, such as extended X-ray absorption fine structure (EXAFS), also benefit from the high degree of linearity in this apparatus at all undulator power levels. A typical EXAFS experiment places a single ion chamber in front of a sample to measure the incident X-ray (I-zero) intensity. A sample is placed between this I-zero monitor and a second ion chamber. EXAFS spectroscopy refers to the measurement of the X-ray absorption coefficient u as a function of photon energy E above the threshold of an absorption edge. In a transmission experiment, as described above, $\mu$ of $\mu x$, where x is the sample thickness, is calculated by $$\mu x = In(I\text{-}zero/I)$$

where I-zero and I are the intensities of the incident and transmitted beams, respectively, measured as a function of energy. If detection of the incident beam or transmitted beam is non-linear, as might be the case with the full undulator beam present on an ion chamber, the computed absorption coefficient will be incorrect.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiments described explain the principles of the invention and practical applications and should enable others skilled in the art to utilize the invention in various embodiments and with various modifications as are suited to the particular use contemplated. It is intended that the scope of the invention be defined by the claims appended hereto.

The embodiment of this invention in which an exclusive property or privilege is claimed is defined as follows:

1. A system to determine the position of an x-ray beam relative to a specific axis comprising:
   a thin metal foil positioned so that said metal foil is approximately perpendicular to said x-ray beam and centered along a preferred axis for said x-ray beam and where said metal foil is selected so that it generates a fluorescent radiation when exposed to said x-ray beam;
   a PIN diode array comprised of a plurality of PIN diodes and positioned so that said PIN diodes intercept a portion of said generated fluorescent radiation;
   a means for holding said plurality of PIN diodes in their specified positions;
   a means for holding said metal foil in its specified position;
   a means for adjusting said PIN diode holding means in a vertical position and in a horizontal position;
   a means for collecting data from said PIN diode array.

2. The system of claim 1 wherein said metal foil is selected from a group consisting of: Ti, Cr, Fe, Co, Ni, Cu, and Zn.

3. The system of claim 1 wherein said horizontal position of said PIN diode array is determined by a horizontal translation stage and wherein said vertical position is determined by a vertical translation stage.

4. The system of claim 1 wherein said metal foil holding means has a vacuum pumpout to allow for a pressure equilibrium to be maintained on either side of the metal foil during evacuation of a chamber within which said metal foil resides.

5. The system of claim 1 wherein said PIN diode holding means has a vacuum pumpout to allow for a pressure equilibrium to be maintained on either side of the PIN diode array.

6. The system of claim 1 wherein said metal foil holding means is capable of holding a plurality of distinct metal foils and is translatable from one position to another such that each member of said plurality of foils can individually be position in the path of said X-ray.

* * * * *